United States Patent [19]

Corsmeier et al.

[11] Patent Number: 5,018,943
[45] Date of Patent: May 28, 1991

[54] BOLTLESS BALANCE WEIGHT FOR TURBINE ROTORS

[75] Inventors: Robert J. Corsmeier, Cincinnati; Richard W. Albrecht, Jr., Fairfield, both of Ohio

[73] Assignee: General Electric Company, Cincinnati, Ohio

[21] Appl. No.: 338,671

[22] Filed: Apr. 17, 1989

[51] Int. Cl.⁵ ............................................. F01D 25/06
[52] U.S. Cl. .................................. 416/144; 416/220 R
[58] Field of Search .............. 416/144, 145, 500, 190, 416/220 R, 219 R; 74/573 R, 574

[56] References Cited

U.S. PATENT DOCUMENTS

| | | | |
|---|---|---|---|
| 2,613,058 | 10/1952 | Atkinson | 416/144 X |
| 2,843,356 | 7/1958 | Hull, Jr. | 416/144 |
| 3,181,835 | 5/1965 | Davis | 416/145 |
| 3,297,302 | 1/1967 | Spears | 416/144 |
| 3,853,425 | 12/1974 | Scalzo et al. | 416/220 R |
| 3,888,601 | 6/1975 | Glassburn | 416/144 |
| 4,304,523 | 12/1981 | Corsmeier et al. | 416/221 |
| 4,477,226 | 10/1984 | Carreno | 416/144 |
| 4,480,957 | 11/1984 | Patel et al. | 416/219 R X |
| 4,480,959 | 11/1984 | Bourguignon et al. | 416/145 X |
| 4,648,799 | 3/1987 | Brown et al. | 416/220 R X |
| 4,803,893 | 2/1989 | Bachinski | 74/573 R |
| 4,842,485 | 6/1989 | Barber | 74/573 R |
| 4,890,981 | 1/1990 | Corsmeier et al. | 416/220 R |

FOREIGN PATENT DOCUMENTS

| | | | |
|---|---|---|---|
| 129431 | 12/1960 | U.S.S.R. | 416/144 |
| 549581 | 5/1977 | U.S.S.R. | 416/145 |
| 2105790 | 3/1983 | United Kingdom | 416/144 |

Primary Examiner—John T. Kwon
Attorney, Agent, or Firm—Jerome C. Squillaro

[57] ABSTRACT

A balance weight for the rotor of a gas turbine engine is adapted to mount within the cavity formed between the innermost surface of the dovetail slots formed in the circumference of the rotor disk and the bottom of the dovetail root of the rotor blades inserted within the dovetail slots. The balance weight has a head portion formed with a bottom surface which mates with the innermost surface of the dovetail slots, and a lip connected to the head portion which engages the aft surface of the rotor disk. The balance weight is supported in an aft direction within the dovetail slots by an aft blade retainer having a shoulder or projection which contacts the balance weight.

10 Claims, 3 Drawing Sheets

BOLTLESS BALANCE WEIGHT FOR TURBINE ROTORS

The government has rights in this invention pursuant to Contract No. F33657-83-C-0281 awarded by the Department of Air Force.

FIELD OF THE INVENTION

This invention relates to the balancing of turbine rotors in gas turbine engines, and, more particularly, to a boltless balance weight located in the dovetail slot of the rotor disk beneath the blade root of the rotor blades.

BACKGROUND OF THE INVENTION

The turbine of gas turbine engines such as those used in jet aircraft provides the power necessary to drive the compressor and accessories, and, in engines which do not make use solely of a jet for propulsion, the turbine provides the power to drive the shaft of a propeller or rotor. Energy produced from the continuous flow of hot gases released by the combustion system of the engine is extracted by the turbine which expands the gases to lower pressure and temperature. In order to produce the driving torque required in the gas turbine engine, turbines normally consist of one or more stages. Each stage of the turbine normally employs one row of stationary nozzle guide vanes fixedly mounted to the turbine case, and a rotor which includes a row of rotor blades circumferentially mounted to the rotor disk. The rotor disk is either formed integrally with or has a shaft flange which is bolted to the shaft of the turbine.

The blades in the rotor of the turbine each have a blade root, e.g., a dovetail root, adapted to mount within mating, circumferentially spaced slots formed around the rim of the rotor disk. The blades also include an air foil extending radially outwardly from the blade root which terminates at a blade tip. In view of the high rotational speeds of the turbine rotor blades and the mass of the materials which form the blades, proper balancing of the rotors of the turbine is extremely important. Any unbalance can seriously affect the rotating assembly bearings and engine operation.

One prior art method of balancing the rotor in the turbine of gas turbine engines has been to employ weights which are bolted to the disk shaft flange of the rotor disk at one or more locations about its circumference. Each weight produces a moment about the center of rotation of the rotor disk which is the product of the mass of the weight and its distance from the center of rotation. The number, position and mass of the weights required is determined first by weighing each individual rotor blade and categorizing them, and then balance testing the turbine rotor. After finding the unbalance of the turbine rotor, the results are compared with the weight of the blades. Each blade is installed in a selected dovetail slot of the rotor disk and final balancing of the rotor is obtained by mounting the balance weights to the disk shaft flanges.

One problem with this balancing method is that a relatively large amount of weight is often needed on the disk shaft flanges of the rotor in order to balance the rotor. This is because the radius or moment arm between the center of rotation of the rotor disk and its aft flange is small. In order to increase the moment produced by the weight over such a short moment arm, the magnitude of the weight must be substantial.

Another problem with mounting balance weights to the aft flange of the rotor disk is that the relatively small radius between the center of rotation of the rotor disk and its aft flange makes it difficult to accurately mount the weights on the aft flange at the desired angular position relative to the center of rotation of the rotor disk. This is particularly true for relatively small angular adjustments, e.g., 1° or 2°, wherein the weights can be moved only a very small distance along the circumference of the aft flange to produce the desired angular adjustment relative to the center of rotation of the rotor disk.

In order to lessen the amount of weight required to balance the rotor, another approach in the prior art to balance turbine rotors involves mounting weights to the blade retainers which are located at the rim of the turbine rotor to prevent fore and aft movement of the rotor blades relative to the rotor disk. These blade retainers are located at a much higher radius from the center of rotation of the rotor disk and thus the moment arm between the center of rotation of the rotor disk and the weights is much larger. As a result, the magnitude of the weight can be reduced compared to the prior art method wherein the weights are mounted to the low radius, disk shaft flanges of the rotor disk.

The problem with mounting prior art balance weights to the blade retainers is that bolts and nuts are required to form the connection therebetween. More current turbine rotors have eliminated bolts and nuts for attaching blade retainers or seals to the rotor disk, and have replaced them with boltless blade retainers and seals. One advantage of boltless blade retainers is that stress concentrations are eliminated because bolt holes are no longer formed in the rotor disk or retainers. In addition, windage problems i.e., interference in the air flow around the turbine rotor created by the presence of obstruction such as bolts and nuts, are reduced by the use of boltless blade retainers and seals. As a result of these improvements in methods of attaching blade retainers and seals, no structure is provided for bolting prior art balance weights at the rim of the rotor disk.

This problem has been overcome to some extent by another prior art method of rotor balancing in which the rotor disk is formed with an arm mounted to the rotor disk at a location intermediate its center of rotation and rim. This arm supports an annular flange formed with circumferentially spaced holes. Balance weights are inserted through such holes and secured to the flange by pins or rivets to balance the rotor.

The problem with this design is that the arm and flange add additional weight and cost to the rotor. Moreover, the holes in the flange create stress concentrations which are likely to reduce the cyclic life of the rotor. Additionally, the protruding balance weights, arm and annular flange produce windage affects which could result in engine performance penalties.

SUMMARY OF THE INVENTION

It is therefore among the objectives of this invention to provide a balance weight particularly adapted for use in turbine rotors employing boltless blade retainers and seals which is of relatively small mass, which minimizes windage affects, which eliminates the need to weigh each rotor blade, which is easy to assemble and which permits fast and easy replacement of the rotor blades.

These objectives are accomplished by a balance weight adapted to be mounted in the cavity formed between the bottom of the dovetail base or root of the rotor blades of the turbine, and the radially innermost, concavely-arcuate shaped bottom surface of the dovetail slots formed in the rim of the rotor disk which mount the rotor blades. The balance weight has a surface adapted to mate with the radially innermost surface of the dovetail slot, and a lip which engages the aft surface of the rotor disk rim. The balance weight is retained in place within the dovetail slots in the forward direction by its lip, and in the aft direction by an aft blade retainer formed with a shoulder which engages the balance weight.

In the presently preferred embodiment, the balance weight has a head portion formed with a forward surface, an aft surface, an outer top surface and an inner bottom surface. The lip extends substantially perpendicularly to the head portion, coplanar with the aft surface thereof. The bottom surface of the head portion is formed in a convexly, arcuate-shape which is adapted to mate with the concavely arcuate-shaped innermost surface of the dovetail slots in the rotor disk. When mounted to the rotor disk, the bottom surface of the head portion of the balance weight rests upon at least a portion of the radially innermost surface of the dovetail slot in the rotor disk, and the lip of the balance weight rests against the aft surface of the rotor disk rim. A shoulder formed on the aft blade retainer engages the balance weight and restrains it from movement in an aft direction out of the dovetail slot in the rotor disk.

The mass of the balance weight, which is preferably formed of metal, can be altered by removing material from the head portion thereof. In order to provide several balance weights of different mass to accommodate the degree of unbalance of a particular rotor disk, the balance weight herein is alternatively formed with one or more recesses or bores extending between its top and bottom surfaces, and/or one or move bores or recesses extending between its forward and aft surfaces.

The balance weight of this invention has a number of advantages over prior art rotor balancing methods and apparatus. The balance weight herein is located at relatively high radius with respect to the axis of rotation of the rotor disk which increases the moment arm between the balance weight and such axis of rotation. This allows less mass to be employed in the balance weight to achieve the same balancing effect obtained in the prior art wherein balance weights are mounted to the rotor disk flange close to axis of rotation of the rotor.

Another advantage of the balance weight herein is that no bolts or nuts are required to mount it to the rotor. As a result, windage losses are eliminated. In addition, the balance weight is located on the aft side of the rotor disk on the radially innermost surface of the dovetail slot so as to minimize blockage or interference with the flow of cooling air from the rotor disk rim radially outwardly to the rotor blades.

Still another advantage of the balance weight of this invention is that weighing of each rotor blade, and locating rotor blades of different weight in selected dovetail slots, is not required. The rotor is balance tested in a conventional manner and the balance weights herein are inserted in the appropriate dovetail slots of the rotor disk depending upon the unbalance of the rotor disk. Assembly of certain rotor blades in specific dovetail slots is not required in order to obtain proper balancing.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
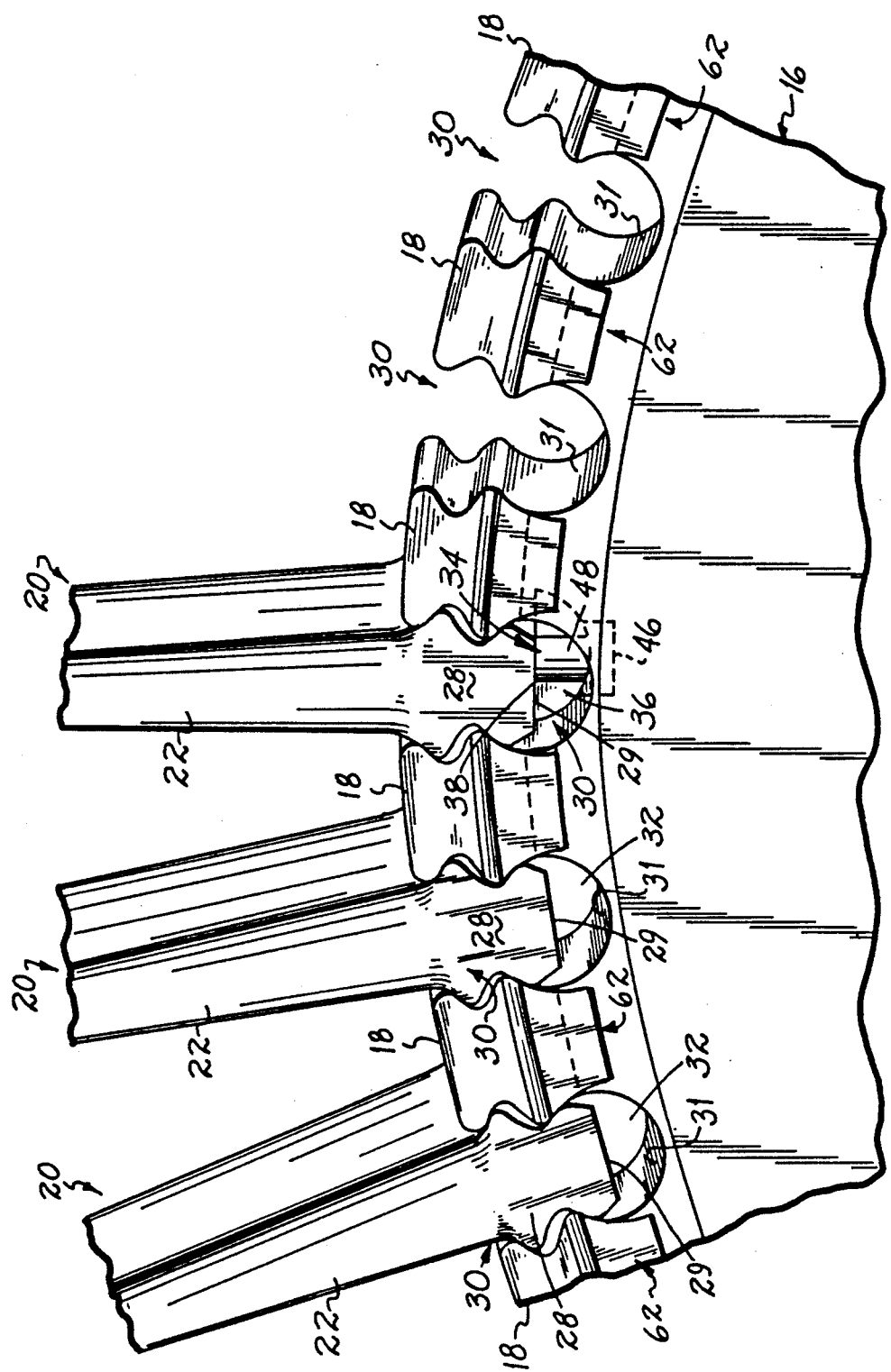
FIG. 1 is a schematic, elevational view of the rim of a rotor disk, looking from the forward direction, in which assembly of the rotor blades in the dovetail slots of the rotor disk is partially completed.
Figure 2:
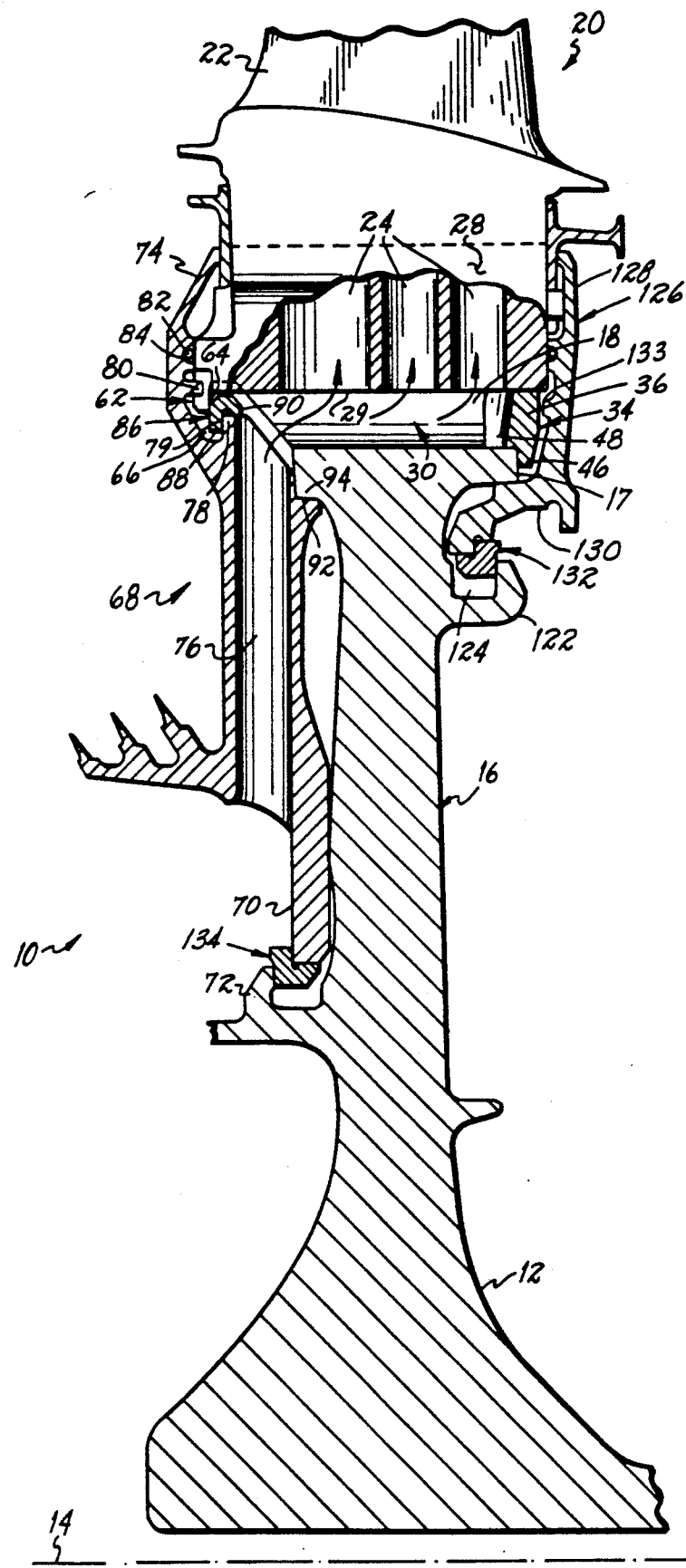
FIG. 2 is an elevational view in partial cross section of a single rotor blade assembled in a dovetail slot with the balance weight in position and the forward and aft blade retainers mounted to the rotor disk.

Referring now to FIGS. 1 and 2, a portion of the turbine of a turbo machine such as a high performance, gas turbine engine is schematically illustrated. A rotor disk 10 has a hub 12 extending axially parallel to the center line 14 of the gas turbine engine (not shown), a web 16 extending radially outwardly from the hub 12 and a plurality of dovetail posts 18 carried on the web 16. Conventionally, the rotor disk 10 and all its elements are annular in shape and support one or more circumferentially extending rows or banks of rotor blades 20, one row of which is partially illustrated in FIG. 1. Each rotor blade 20 comprises an air foil 22 having a blade tip, a platform and a dovetail root 28 terminating with a bottom surface 29.

The dovetail root 28 of each rotor blade 20 is axially slidable into the mating dovetail slot 30 formed by adjacent dovetail posts 18 of the rotor disk 10. The dovetail slot 30 has a concavely shaped, radially innermost surface 31 which extends between adjacent dovetail posts 18. With the rotor blades 20 in position as shown in FIG. 1, a cavity 32 is formed between the bottom surface 29 of the dovetail root 28 of each rotor blade 20 and the innermost surface 31 of each dovetail slot 30. In this position, the rotor blades are held in place by the dovetail posts 18 against movement both in a radial direction and in a tangential direction, but not in an axial direction.

Referring to FIG. 2, as used herein the term "radial" refers to a direction toward or away from the center line 14 of the rotor disk hub 12; e.g., "radially outwardly" denotes a direction away from the center line 14, and "radially inwardly" denotes a direction toward the center line 14. The term "axial" refers to a direction parallel to the longitudinal axis or center line 14 of the rotor disk hub 12. As viewed in FIG. 2, the term "forward" refers to the lefthand side, and the term "aft" refers to the righthand side of FIG. 2. The term "tangentially" as used herein refers to a direction perpendicular to the center line 14 extending into the plane of the paper.

Figure 3A:
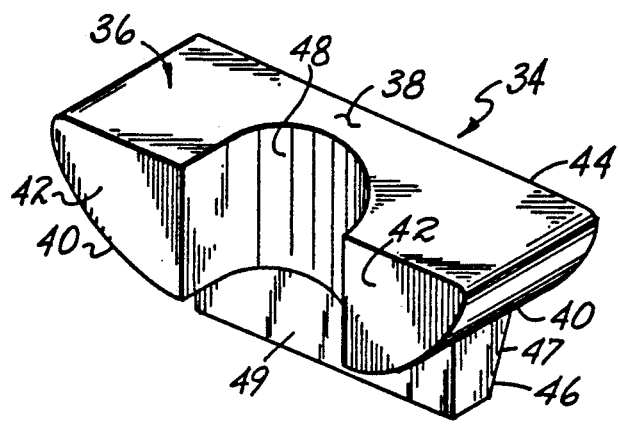
FIGS. 3A-3C are perspective views of alternative embodiments of the balance weight of this invention.
Figure 3B:
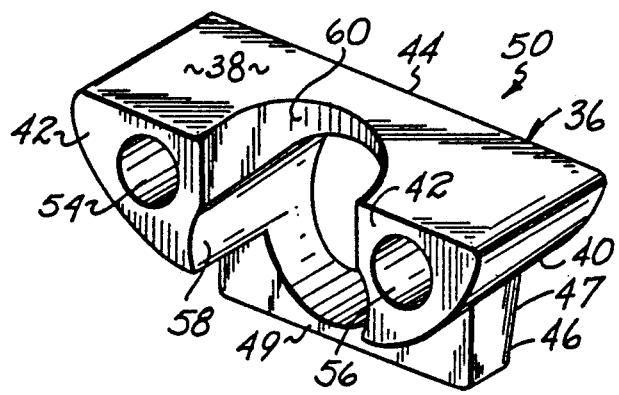
Figure 3C:
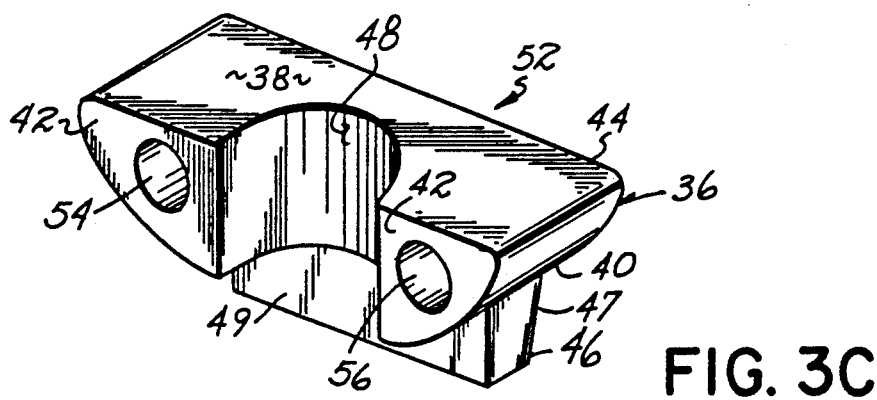

Referring now to FIGS. 3A-3C, various embodiments are illustrated of balance weights employed in this invention. In FIG. 3A, a balance weight 34 is illustrated which comprises a head portion 36 having a radially outer or top surface 38, a radially inner or bottom surface 40, a forward surface 42 and an aft surface 44. In the presently preferred embodiment, the bottom surface 40 of head portion 36 is convexly arcuate in shape and is adapted to mate with the concavely arcuate-shaped innermost surface 31 of each dovetail slot 30 formed in the rotor disk 10.

A radially inwardly extending lip 46 is connected to the head portion 36 which is formed with an aft surface 47 substantially coplanar with the aft surface 44 of head portion 36 and a forward surface 49 spaced from the forward surface 42 of head portion 36. As shown in FIGS. 1 and 2, the lip 46 is adapted to rest against the aft surface 17 of the rim of the web 16 of rotor disk 10 to prevent movement of the balance weight 34 in the forward direction. In this position, the head portion 36 of the balance weight 34 extends at least partially within the cavity 32 formed between the innermost surface 29 of the dovetail root 28 of rotor blade 20 and the innermost surface 31 of the dovetail slot 30.

In the embodiment of balance weight 34 illustrated in FIG. 3A, a recess 48 is formed in the head portion 36 which extends between its top surface 38 and bottom surface 40. This recess 48 comprises an area where material is removed from the head portion 36 in order to allow cooling air to flow unrestrained into the aft one of the blade feeder holes 24.

The balance weights 50 and 52 illustrated in FIGS. 3B and 3C, respectively, are identical to the balance weight 34 shown in FIG. 3A except different amounts of material are removed from their head portions 36 to vary their weight. For example, in the balance weight 50 of FIG. 3B, first and second throughbores 54, 56 are formed on opposite sides of the head portion 36 and extend between its forward surface 42 and aft surface 44. The head portion 36 and a portion of the lip 46 are also formed with a central throughbore 58 extending between the forward surface 42 of head portion 36 and the aft surfaces 44 and 47 of the head portion 36 and lip 46, respectively. A recess 60 extends from the top surface 38 of head portion 36 to the central throughbore 58.

The balance weight 52 has a recess 48 as in the balance weight 34 of FIG. 3A, and also includes first and second throughbores 54, 56 as in the embodiment of FIG. 3B. These three balance weights 34, 50, 52 thus have different weights, i.e., from the heaviest weight 34 to the lightest weight 50, to accommodate different amounts of unbalance in a particular rotor assembly as shown in FIG. 2.

Referring now to FIGS. 1 and 2, the retainer structures for preventing movement of the rotor blades 20 in the forward and aft axial directions are illustrated. These blade retainers are discussed in detail in U.S. Pat. No. 4,890,981 which issued from a co-pending application Ser. No. 292,084, filed Dec. 30, 1988, and entitled "Boltless Rotor Blade Retainer" which is assigned to the same assignee as this invention and is incorporated by reference in its entirety herein. The blade retainers are thus described only briefly herein and reference should be made to such application for a detailed discussion of same.

The dovetail posts 18 of rotor disk 10 are each formed with a radially inwardly extending hook 62 having an aft surface 64. The hooks 62 are spaced from the body of the dovetail posts 18 forming a cavity 66 therebetween. The dovetail posts 18 and rotor blades 20 are air-cooled by a one-piece, annular impeller 68 carried on the rotor disk 10. The impeller 68 has an inner end 70 mounted to a projection 72 formed on the web 16 of the rotor disk 10, and an upper end 74 which spans the dovetail slot 30 formed between adjacent dovetail posts 18.

The impeller 68 is formed with a plurality of ribs 76, one of which is shown in FIG. 2, which are adapted to direct a stream of cooling air radially outwardly to the dovetail posts 18 and rotor blades 20 to cool such elements. The cooling air is channeled through air feeder holes 24 formed in the dovetail root 28 before passing into cooling air passages in the air foil 22 (not shown). The balance weights 34, 50 or 52 are positioned with respect to such air feeder holes 24 on the aft side of the dovetail slot 30 to avoid any blockage of cooling air flowing therethrough.

The impeller 68 is also formed with a radially outwardly extending flange 78 having a forward surface 79, and a number of tabs 80 spaced around the circumference of the impeller 68, one of which is shown in FIG. 2. With the impeller 68 in position relative to the rotor disk 10, the forward surface 79 of flange 78 faces the aft surface 64 of hook 62, and the tabs 80 contact the hooks 62 of
13DV-9024 dovetail posts 18 to prevent rotation of the impeller 68 relative to the rotor disk 10.

An annular, split ring seal 82 is carried in a groove 84 formed in the outer end 74 of impeller 68 which seats against the dovetail posts 18. This split ring seal 82 prevents leakage of cooling air moving along the impeller 68 radially outwardly to the air feeder holes 24 of the rotor blades 20.

The outer end 74 of impeller 68 is mounted in an axially fixed position relative to the rotor disk 10 by a U-shaped retaining ring 86. The retaining ring 86 has a forward leg 88 and an aft leg 90, as viewed in FIG. 2, with the aft leg 90 being slightly shorter than the forward leg 88. In the assembled position, the retaining ring 86 is movable to a seated, locked position in which the forward leg 88 is interposed between the aft surface 64 of hook 62 and the forward surface 79 of flange 78, and the aft leg 90 of retaining ring 86 rests atop the flange 78 of impeller 68.

In the seated, locked position of retaining ring 86, axial movement of the impeller 68 in a forward direction is prevented by engagement of the retaining ring 86 with a hook 62 of dovetail posts 18. Axial movement of the impeller in an aft direction is prevented by engagement of a notch 92 formed in the impeller 68 with a shoulder 94 formed on the web 16 of rotor disk 10, as well as the structure which mounts the inner end 70 of impeller 68 to the web 16 as described below. In turn, axial movement of the rotor blades 20 within the dovetail slots 30 formed by adjacent dovetail posts 18 is restrained in the forward axial direction by the outer end 74 of impeller 68.

As shown in FIG. 2, retaining structure is also provided on the aft side of the rotor disk 10 to prevent axial movement of the rotor blades 20 and balance weights 34, 50 or 52 in an aft direction. This structure is disclosed and claimed in U.S. Pat. No. 4,304,523, assigned to the same assignee of this invention, which is incorporated by reference in its entirety herein. Furthermore, this same structure is employed to mount the inner end 70 of impeller 68 to the projection 72 of rotor disk web 16.

The aft side of the rotor disk web 16 is formed with an L-shaped arm 122 forming a cavity 124. An aft blade retainer 126 is positioned relative to the web 16 and the dovetail posts 18 such that its outer end 128 spans the dovetail slots 30 and its inner end 130 extends radially inwardly to the cavity 124 formed by the L-shaped arm 122. An aft retaining ring 132 is carried within the cavity 124.

As described in detail in U.S. Pat. No. 4,304,523, the aft blade retainer 126 and aft retaining ring 132 are manipulated so that the aft retaining ring 132 slides in between the inner end 130 of aft blade retainer 126 and the L-shaped arm 122 of rotor disk web 16. In this position, the aft retaining ring 132 secures the aft blade retainer 126 in a fixed axial position with respect to the dovetail posts 18. In turn, the outer end 128 of aft blade retainer 126 prevents axial movement of the rotor blades 20 in an aft direction.

In the presently preferred embodiment, the aft blade retainer 126 is formed with a shoulder 133 which, in the assembled position, engages the balance weights 34, 50 or 52 to prevent their movement in an aft direction. The balance weights 34, 50, 52 are thus held in position within the dovetail slots 30 in the forward direction by the lip 46 and in the aft direction by the aft blade retainer 126.

As discussed above, the blade retainer structure employed on the aft side of the rotor blades 20 in the embodiment of FIG. 2 is also used to mount the inner end 70 of impeller 68 to the web 16 of the rotor disc 10. In FIG. 2, a blade retainer 126 is mounted to the L-shaped arm 122 on the aft side of web 16 by an aft retaining ring 132 of the same type shown and disclosed in U.S. Pat. No. 4,304,523. Similarly, the lower end 70 is secured to the projection 72 on web 16 by a retaining ring 134 in the same manner disclosed above.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, the number and location of the areas of each balancing weight 34, 50 or 52 in which material has been removed, e.g., at bores 54, 56 and 58, could be altered, as desired, to remove more or less material and change the weight thereof to accommodate a particular degree of unbalance of a given rotor disk 10.

Therefore, it is intended that the invention not be limited to the particular embodiment disclosed as the best mode contemplated for carrying out this invention, but that the invention will include all embodiments falling within the scope of the appended claims.

We claim:

1. A balanced rotor of a gas turbine engine, comprising:
    a rotor disk formed with circumferentially spaced slots each having a radially innermost surface;
    a row of turbine rotor blades extending radially outwardly from the circumference of said rotor disk, each of said rotor blades being formed with a blade root having a bottom surface, said rotor blades being insertable within said dovetail slots of said rotor disk so that a cavity is formed between said bottom surface of said blade root and said radially innermost surface of said slots;
    balance means insertable within said cavity for balancing said rotor; and
    wherein said rotor disk has an aft surface and a forward surface, said balance means comprising a balance weight having a bottom surface engageable with said radially innermost surface of said slots in said turbine disk and a lip engageable with said aft surface of said rotor disk.

2. The balanced rotor of claim 1 in which said balance weight has a head portion connected to said lip, said portion having an arcuate bottom surface adapted to mate with said radially innermost surface of said dovetail slots.

3. A balanced rotor of a gas turbine engine, comprising: a rotor disk having a forward surface and an aft surface, said rotor disk being formed with circumferentially spaced slots each having a radially innermost surface extending between said forward and aft surfaces of said rotor disk;
    a row of turbine rotor blades extending radially outwardly from the circumference of said rotor disk, each of said rotor blades being formed with a blade root having a bottom surface, said rotor blades being insertable within said dovetail slots of said rotor disk so that a cooling air flow cavity is formed between said bottom surface of said blade root and said radially innermost surface of said slots;
    balance means insertable within said cavity for balancing said rotor;
    a forward blade retainer adapted to mount to said forward surface of said rotor disk and an aft blade retainer adapted to mount to said aft surface of said rotor disk, said forward and aft blade retainers being effective to prevent movement of said rotor blades in a fore-aft axial direction relative to said slots of said turbine disk;
    means carried by aft blade retainer for retaining said balance means within said cavity; and said balance means comprises a balance weight having a bottom surface engageable with said radially innermost surface of said slots in said turbine disk, and a lip engageable with said aft surface of said rotor disk.

4. The balanced rotor of claim 3 in which said balance weight has a head portion connected to said lip, said head portion having an arcuate bottom surface adapted to mate with said radially innermost surface of said dovetail slots.

5. The balanced rotor of claim 3 in which said means for retaining said balance means within said cavity comprises a shoulder formed on said aft blade retainer, said shoulder being engageable with said balance means to prevent axial movement of said balance means.

6. A balance weight for balancing a gas turbine engine rotor, the rotor including a rotor disk having fore and aft surfaces which is formed with circumferentially spaced slots each having a radially innermost surface, and a row of turbine rotor blades each having a blade root insertable within the slots of the rotor disk, said balance weight comprising:
    a head portion having a forward surface, an aft surface, a top surface and a bottom surface, said bottom surface of said head portion being matable with the radially innermost surface of the slots in the rotor disk;
    a lip connected to said head portion, said lip being engageable with one of the fore and aft surfaces of the rotor disk upon placement of said bottom surface of said head portion in contact with the radially innermost surface of said slots.

7. The balance weight of claim 6 wherein the radially innermost surface of the slots in the rotor disk is generally concavely arcuate in shape, said bottom surface of said head portion of said balance weight being generally convexly arcuate ion shape to mate with the radially innermost surface of said slots.

8. The balance weight of claim 6 in which said head portion is formed with a recess extending between said top surface and said bottom surface of said head portion to permit the passage of cooling air therethrough.

9. The balance weight of claim 6 in which said head portion is formed with at least one area where material is removed therefrom, said area extending at least partially between said forward surface and said aft surface of said head portion.

10. The balance weight of claim 6 in which said at least two areas are formed with materials removed therefrom, one of said areas extending at least partially through said lip and the other of said areas extending at least partially between said forward surface and said aft surface of said head portion.

* * * * *